United States Patent  [11] 3,607,845

[72] Inventors Robert W. Ireland;
 Douglas E. Skillicorn, both of Avon Lake, Ohio
[21] Appl. No. 864,217
[22] Filed Oct. 6, 1969
[45] Patented Sept. 21, 1971
[73] Assignee The B. F. Goodrich Company
 New York, N.Y.

[54] FERRIC CHLORIDE CURED MERCAPTAN-TERMINATED POLYMERS
 8 Claims, No Drawings
[52] U.S. Cl. ................................................ 260/79,
 260/33.4 R, 260/41 R, 260/41.5 R, 260/79.5 R, 260/79.5 B
[51] Int. Cl. ........................................................ C08g 23/00

[50] Field of Search .......................................... 260/79.5, 79, 608

[56] References Cited
UNITED STATES PATENTS
3,402,155 9/1968 Kutch ............................ 260/79
3,423,374 1/1969 Jones ............................ 260/79

*Primary Examiner*—Joseph L. Schofer
*Assistant Examiner*—C. A. Henderson, Jr.
*Attorneys*—Thomas M. Schmitz and J. Hughes Powell, Jr.

ABSTRACT: Mercaptan-terminated liquid polymers in combination with ferric chloride and amine accelerators provide curable one-component elastomeric compositions suitable for sealant and caulking compositions.

FERRIC CHLORIDE CURED MERCAPTAN-TERMINATED POLYMERS

BACKGROUND OF THE INVENTION

Caulking compositions are widely used for architectural applications for sealing joints and seams between adjacent building structures. For example, caulks have been customarily employed outdoors around the periphery of windows, door jams, chimneys, dormers and like abutting structures. Caulking is utilized indoors around bath tubs, shower stalls, in basements, rest room installations and like indoor structures where sealing against dirt and moisture is required. Further applications and desirable features of architectural caulking compositions are outlined in Federal Specification TT-S-00230 b (Comm-NBS).

Caulking compounds based on drying oil vehicles have been substantially replaced with polymeric compositions and are, accordingly, now referred to as sealants. Such sealants or caulks are preferably packaged as one-component or one-part self-curing compositions. The self-curing sealants remain fluid indefinitely within airtight containers, such as tubes or bulk containers, and cure to a resilient solid upon being exposed to the air.

It now has been found that mercaptan terminated liquid polymers provided an excellent one component caulking or sealant composition useful for both indoor and outdoor architectural applications. The one-component caulking compositions advantageously overcome undesirable short pot life associated with two-component curing systems based on mercaptan terminated polymers which are well known in the art. The one-component caulking compositions based upon mercaptan terminated liquid polymers within the scope of this invention remain fluid within closed containers and, upon exposure to atmospheric oxygen, cure to an elastomeric resilient solid. Further advantages of the one-component caulking composition includes good workability, sag resistance, short cures to a tack free surface, extended resistance to moisture and weathering, and good adhesion to many types of substrates during large temperature changes. These and other advantages of the one-component caulking composition will become more apparent from the Detailed Description of the Invention.

SUMMARY OF THE INVENTION

Briefly, a one component caulking or sealant composition is provided having an extended shelf life while maintained in a closed container. The caulking composition includes a mercaptan-terminated fluid polymer in combination with a ferric chloride curing agent and amine accelerator which, upon exposure to air, cures such polymeric composition to an elastomeric resilient solid.

DETAILED DESCRIPTION

Desirable mercaptan terminated liquid polymers suitable for one-component caulking compositions within the scope of this invention may be based upon a wide variety of mercaptan polymers. Thus, suitable liquid polymers include mercaptan terminated liquid polymers well known in the art such as diones being based on polyether, thiokols being based upon polysulfides, MTBN being based upon butadiene-acrylonitrile copolymers, MTA being based upon polyacrylates, mercaptan terminated polyisoprenes, mercaptan terminated polyisoprene-acrylonitrile copolymers, and like mercaptan terminated liquid polymers. Detailed descriptions of various mercaptan terminated liquid polymers and suitable methods of preparations are outlined in U.S. Pats. Nos. 3,431,239; 3,047,544, 3,449,301 and British Pat. No. 741,818.

Preferred mercaptan terminated liquid polymers have an average molecular weight of at least about 1,000 up to about 10,000 and contain at least about 0.5 weight percent mercaptan (—SH), and preferably 0.5 to 8.0 weight percent mercaptan. Most preferred polymers contain from about 0.9 to about 7.0 weight percent mercaptan. Further, preferred mercaptan terminated liquid polymers have a mercaptan functionality of at least about 1.1, and preferably from about 1.6 to about 2.4. Hence, mercaptan terminated liquid polymers exhibit polyfunctionality with respect to the mercaptan terminal groups and, therefore, may be converted or chemically cured to a nonfluid elastomeric material as hereinafter described.

Mercaptan terminated liquid polymers are combined with ferric chloride curing agent. Although either anhydrous or hydrous ferric chloride may be used, the anhydrous ferric chloride is preferred due to its powdery consistency enabling easier mixing in the compounding stage. For similar reasons, sublimed ferric chloride is preferred providing better dispersion characteristics in addition to being a high purity ferric chloride. Depending upon the cure times desired, at least about 2 weight parts of ferric chloride, and preferably at least about 4 weight parts should be combined with 100 weight parts of liquid polymer. Ordinarily the ferric chloride is dispersed in commercially available glycol or other suitable carrier prior to combining the ferric chloride with the liquid polymer. The glycol carrier merely provides a medium for even distribution of the ferric chloride within the liquid polymer. Upon adding the ferric chloride and glycol mixture to the mercaptan terminated liquid polymer, such composition is then packaged in airtight containers such as tubes or bulk units.

Prior to adding the ferric chloride and glycol mixture, an amine accelerator is added to the mercaptan terminated liquid polymer. Suitable amine accelerators include, for example, alkyl amines such as triethylene tetramine (TETA), diethylene triamine (DETA), tetramethyl pentamine (TEPA), tetraethyl guanidine, dimethylamino-propylamine and dimethylaminoethanol. Suitable amine accelerators further include: cycloaliphatic amines, such as N,N-dimethyl cyclohexylamine; aryl-alkyl amines such as 2,4,6-tri-dimethylaminomethyl-phenol; heterocyclic amines such as N-aminoethyl piperazine. Amine accelerators are ordinarily added in amounts of about 0.1 to 5.0 weight parts per 100 weight parts of mercaptan terminated nitrile polymer. Amine terminated polymers which additionally act as a plasticizer may be utilized and such plasticizers may be added in larger amounts.

Further compounding ingredients well known in the art may be added to the mercaptan terminated liquid polymer to provide caulking compositions with the proper consistency. Modifying ingredients are generally described as inorganic fillers, thixatropes, plasticizers and reinforcing agents. Inorganic fillers include, for example, clays, silicas, calcium carbonates, talc, mica, silicates, and like inorganic fillers. Thixatropes include, for example, Cab-O-Sil, asbestos fibers, nylon flocs, rayon flocs, cotton flocs and like textile flocs. Plasticizer include, for example, petroleum processing oils, aromatic oils and dialkyl phthalates such as dioctyl phthalate and dibutyl phthalate. Reinforcing agents include, for example, carbon blacks, fine silicas, and the like.

The foregoing description is for clearness and understanding and modifications thereof will be obvious to those skilled in the art. The following examples and discussions will further illustrate the merits of this invention. All parts indicated are by weight unless otherwise noted.

EXAMPLE I

| | |
|---|---|
| 100 | Hycar MTBN (1) |
| 5 | Ferric Chloride |
| 7 | Ethylene Glycol |
| 100 | Calcium carbonate 010 whiting |
| 5 | Cab-O-Sil |
| 0.2 | Mercaptan mask (perfume) |
| 1.0 | 2,4,6--tris dimethylaminomethyl-phenol DMP-30 |
| 10.0 | Titanium-dioxide—Titanox RA-50 |

[1] Mercaptan terminated copolymer of butadiene-acrylonitrile having about 24 percent bound acrylonitrile by weight. Mercaptan content is about 3.0 weight percent.

The caulk was applied to a ⅛-inch seam on outdoor exposure panels. These cured tack free in about 2 hours and cured to elastomeric resilient solid in about 30 days. The caulk provided permanent sealant properties having good resistance to weathering, maintaining integrity and retaining good adhesion to the abutting wood substrates.

EXAMPLE II

| | |
|---|---|
| 100 | Hycar MTA (1) |
| 50 | Calcium carbonate 010 whiting |
| 5 | Cab-O-Sil M-5 |
| 5 | Ferric chloride |
| 7 | Ethylene glycol |
| 0.2 | Mercaptan mask (aromatic perfume) |
| 1.0 | DMP-30 |
| 15 | Titanium-dioxide—Titanox RA-50 |
| 30 | Atomized aluminum |

[1] Mercaptan-terminated branched acrylic polymer having about 70 weight percent butyl acrylate and about 30 weight percent ethyl acrylate, and a viscosity of 14,000 c.p.s. and mercaptan content of about 2 weight percent.

The caulking composition was applied to abutting outdoor exposure panels having about a ⅛-inch space therebetween. The caulk cured to tack free elastomeric surface in about 4 hours providing a good sealant against weathering and having good adhesion to the substrate.

EXAMPLE III

| | |
|---|---|
| 100 | Hycar MTBN |
| 5 | Ferric Chloride-anhydrous, sublimed |
| 7 | Ethylene glycol |
| 75 | Calcium carbonate 010 whiting |
| 3 | Asbestos powder |
| 0.2 | Mercaptan mask |
| 17.5 | Talc |
| 5 | Cab-O-Sil |
| 1.0 | DMP-30 |

The caulking composition was applied to about a 1/16 inch test joint formed by black iron abutting brick masonary. The caulk cured tack free and formed an elastomeric solid, resisted extreme weathering and maintained good adhesion after a year exposure outdoors.

EXAMPLE IV

| | A | B | C | D | E |
|---|---|---|---|---|---|
| Hycar MTBN | 100 | 100 | | 100 | |
| Hycar MTA (1) | | | 100 | | 100 |
| Ferric Chloride | 3 | 3 | 22 | 5 | 5 |
| TETA (amine) | 2 | | | 2 | |
| DMP-30 | | 2 | | | |
| Epoxy coreactant X120 (2) | | | 22 | | 22 |
| Talc | | | 25 | | |

[1] Mercaptan terminated branched acrylic polymer having about 70 weight percent n-butyl acrylate and about 30 weight percent ethyl acrylate, viscosity of about 7,500 c.p.s., and a mercaptan weight of about 2.3 weight percent.

[2] Believed to have terminal >C=NH groups that convert to an amine upon exposure to moisture.

Each of the above caulking compositions cured to a tough resilient sealant upon exposure on test applications both indoors and outdoors. Indoor applications included caulking peripheries of tubes and shower installations. The sealants maintained extended integrity and provided good adhesion to abutting substrates.

EXAMPLE V

| | |
|---|---|
| 100 | Hycar MTBN |
| 100 | Calcium carbonate 010 whiting |
| 10 | Cab-O-Sil M-5 |
| 4 | Ferric Chloride |
| 1 | Ethylene glycol |
| 1 | DMP-30 |
| 2 | Ferro blue |
| 2 | d-n-butyl thiourea |

The caulking composition was applied to about ⅛-inch seam between abutting panels on an outdoor test rack. After about a 1 year exposure the sealant maintained integrity, remained resilient, and continued to adhere well to abutting substrates.

The foregoing examples illustrate that mercaptan terminated liquid polymers in combination with ferric chloride and an amine accelerator unexpectedly provide stable one-component caulking compositions. The unexpected cure provided by ferric chloride upon exposure to the atmosphere is even more remarkable in view of various compositions utilizing related metal salts failed to provide a satisfactory cure.

Although specific embodiments of preferred compositions have been provided, all obvious variations and modifications discernible by one skilled in the art are contemplated and are included within the spirit and scope of this invention as defined in the appended claims.

1. A self-curing composition which cures to an elastomeric solid upon exposure to air, which comprises: a mercaptan terminated liquid polymer having a molecular weight of at least about 1,000 and mercaptan functionality of at least about 1.1 with at least about 2 weight parts of ferric chloride and at least about 0.1 weight parts of amine accelerator per 100 weight parts of said liquid polymer.

2. The self-curing composition of claim 1 wherein the mercaptan terminated liquid polymer has a molecular weight of about 1,000 to 10,000 and mercaptan functionality of about 1.1 to 2.4 and a mercaptan weight content of about 0.5 to 8.0 weight percent.

3. The self-curing composition of claim 2 wherein the mercaptan terminated liquid polymer has a molecular weight of about 1,000 to 9,000 and a mercaptan functionality of about 1.6 to 2.4 and mercaptan weight content of about 0.9 to about 7.0 weight percent.

4. The self-curing composition of claim 3 wherein the amine accelerator is present in amounts of about 0.1 to about 5.0 weight parts per 100 weight part of said liquid polymer.

5. The self-curing composition of claim 4 wherein ferric chloride is present in amounts of at least about 4 weight parts per 100 weight parts of said liquid polymer.

6. The self-curing composition of claim 1 wherein the ferric chloride is sublimed and anhydrous ferric chloride.

7. The self-curing composition of claim 5 wherein the amine is 2,4,6-tri-dimethylaminomethyl-phenol.

8. The self-curing composition of claim 5 wherein the amine is triethylenetetraamine.